M. P. FUNK.
STEERING GEAR.
APPLICATION FILED MAR. 24, 1919. RENEWED SEPT. 13, 1920.
1,360,518.
Patented Nov. 30, 1920.
2 SHEETS—SHEET 1.
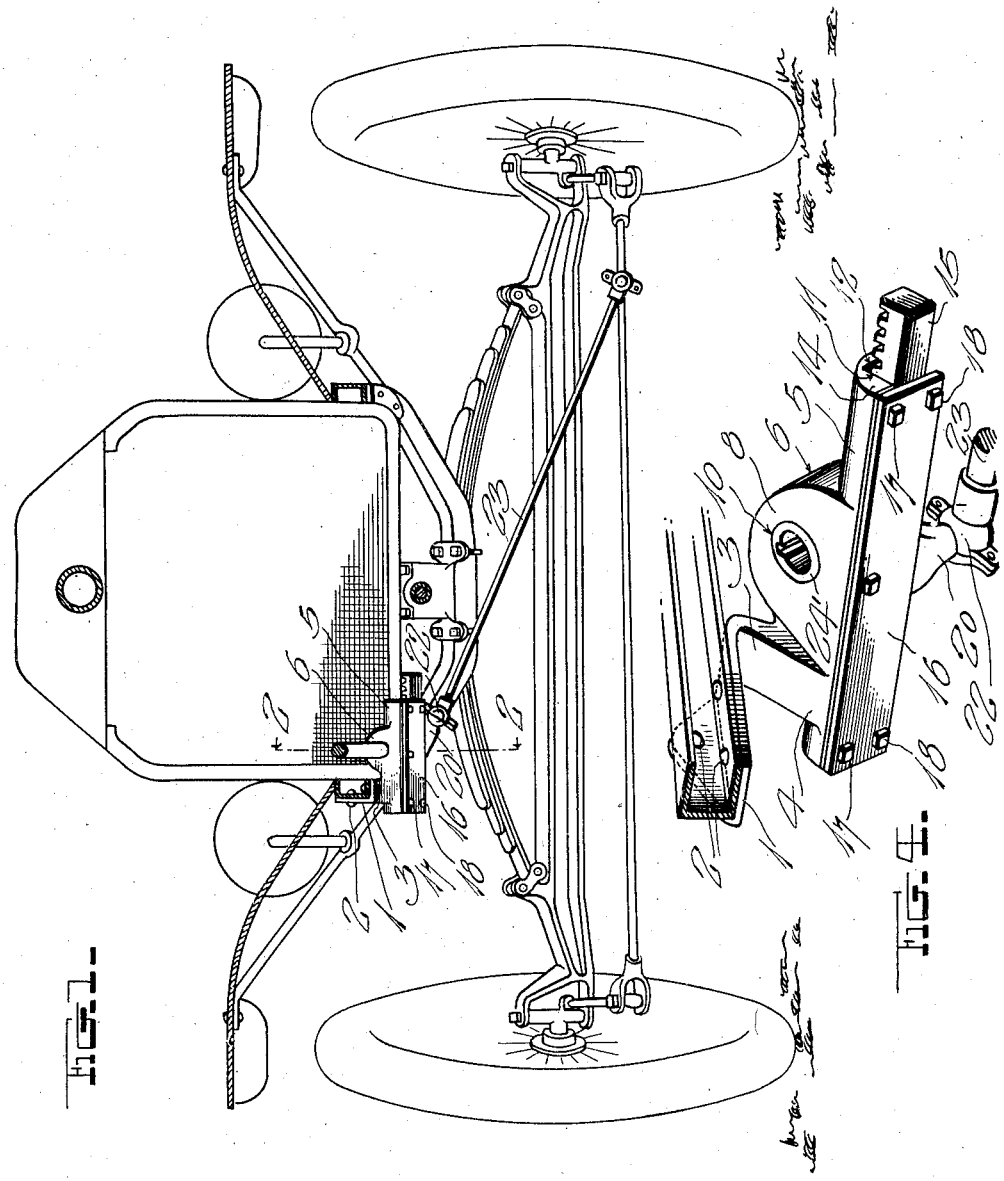
Witness
H. Woodard
Inventor
M. P. Funk,
By H. B. Willson & Co
Attorneys

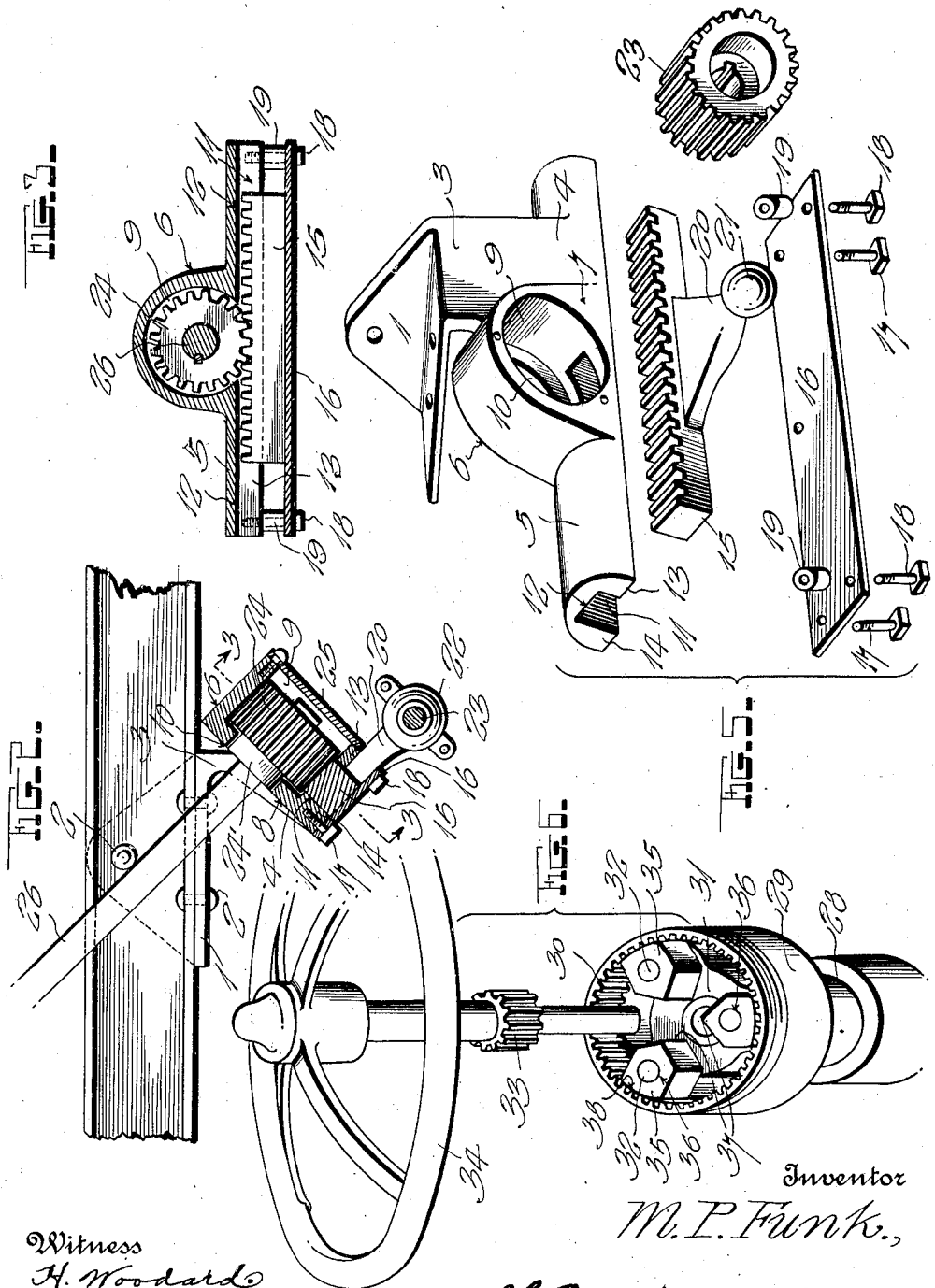

UNITED STATES PATENT OFFICE.

MARION P. FUNK, OF ENID, OKLAHOMA, ASSIGNOR TO WILL C. ALLEN, OF ENID, OKLAHOMA.

STEERING-GEAR.

1,360,518.   Specification of Letters Patent.   Patented Nov. 30, 1920.

Application filed March 24, 1919, Serial No. 284,617. Renewed September 13, 1920. Serial No. 410,008.

*To all whom it may concern:*

Be it known that I, MARION P. FUNK, a citizen of the United States, residing at Enid, in the county of Garfield and State of Oklahoma, have invented certain new and useful Improvements in Steering-Gear; and I do declare the following to be a full, clear, and exact description of the invention, such as will enable others skilled in the art to which it appertains to make and use the same.

My invention has for its object to provide a simply constructed, inexpensive, and easily installed attachment for Ford and other similar automobiles, so constructed as to substitute a gear and rack mechanism at the lower end of the steering shaft for the crank arm, and to eliminate the use of the planetary gearing at the upper end of said shaft, the present invention residing principally in the novel construction of the casting which is secured to the frame of the machine and supports the rack and pinion.

Figure 1 of the accompanying drawings is a transverse section of the front end of an automobile equipped with the invention.

Fig. 2 is a vertical section on the plane of the line 2—2 of Fig. 1.

Fig. 3 is a horizontal section on the plane indicated by the line 3—3 of Fig. 2.

Fig. 4 is a perspective view of the assembly employed at the lower end of the steering shaft, looking at the rear portion thereof.

Fig. 5 is a disassembled perspective view of the parts shown in Fig. 4, looking at the front thereof.

Fig. 6 is a disassembled perspective view of the steering wheel assembly.

In the drawings above briefly described, the numeral 1 designates an L-shaped bracket adapted to be secured by rivets or the like 2 to the frame of an automobile, said bracket being provided with a depending arm 3 enlarged at its lower end at 4 and here joined to one end of a horizontally elongated body member 5 which is adapted for transverse disposition upon the machine. At its center, the body member 5 is provided with an upwardly and forwardly inclined lug 6 which is joined to one edge of the arm 3, said lug having front and rear flat faces 7 and 8 respectively, an upwardly and rearwardly inclined socket 9 opening through said front face 7, and an opening 10 leading from the rear face 8 into the inner end of the socket. Communicating with the socket 9 is a channel 11 which is formed longitudinally in the lower side of the body member 5, the top 12 of said channel being disposed in a plane parallel with the axis of the socket 9 and opening 10, while the side walls of said channel are disposed at right angles to said bottom, the front side wall 13 of the channel being of less height than the rear wall 14 thereof.

The construction so far described is formed in a single piece by casting, and machining is done wherever necessary, particularly along the bottom and sides of the channel 11. It will be observed that the arrangement is such as to cause the lug 6 to form a reinforce or brace between the arm 3 and the body member 5, in addition to performing its other functions, and due to the shape and arrangement of parts, the device may be easily constructed and applied, the present showing being intended principally for use upon a Ford automobile, although it might be employed on others.

Positioned slidably within the channel 11, is a rack bar 15 and secured over said channel is a bottom plate 16, the rear edge of said plate being secured in place by cap screws or the like 17 while similar fasteners 18 pass through the front edge of the plate and through spacing sleeves 19 to secure the plate to and in spaced relation with the front wall 13 of the channel 11, the aforesaid rack bar being provided with a neck 20 which extends forwardly through the space between the plate 16 and wall 13. The neck 20 is provided on its outer end with a ball 21 for reception in the usual socket 22 on the steering rod 23 of the automobile, whereby when the rack bar is shifted by turning the pinion 24 which meshes therewith, the machine will be steered as required. The pinion 24 is located in the socket 9 and is provided with a hub 24' rotatable in the opening 10, and a plate 25 closes the front end of the socket so that the latter may well be packed with grease. By any preferred means such as a key and nut arrangement (not shown), the pinion may be secured on the lower end of the steering shaft 26.

On the Ford automobile, and on some other machines, the shaft 26 is usually connected with the steering rod 23 by means of a crank, but if such a crank is used upon the machine, the pinion and rack take its place as shown. Another feature employed on Ford automobiles is a planetary gear set in the steering wheel assembly for turning the steering shaft 26 with increased power from the steering wheel. Due to the nature of the present invention, it is not advisable to employ such planetary gearing, since the steering gear would not operate as quickly as necessary, but would require several rotations of the steering wheel to produce results. I therefore contemplate the elimination of certain gears of the planetary gear set and the locking of the steering wheel directly to the shaft 26. The method of accomplishing this end is fully illustrated in Fig. 6, in which figure 28 designates the tubular steering post having the usual gear case 29 fixed on its upper end and provided with an internal gear ring 30. Within the case 29 is a head 31 carried by the steering shaft 26, said head having upstanding studs 32 which commonly carry pinions to mesh with the gear ring 30 and with the main pinion 33 which is driven by the steering wheel 34. In the present invention, however, I remove the pinions from the studs 32 and substitute metal blocks 35 having openings 36 to receive said studs, the inner ends of the blocks being pointed at 37 to engage the pinion 33, while the outer ends thereof are curved at 38 for contact with the gear ring 30. By this arrangement of parts, the steering wheel 34 is directly connected with the steering shaft 26 so that any slight movement of the wheel will be immediately imparted to the pinion 23 and rack 15, thus making the steering gear quick acting and sensitive, although the wheel will have considerably less tendency to wrench loose from the driver's grip as now often occurs.

I am aware that steering devices have heretofore been employed using a pinion and rack for operating a steering rod and also know it to be old to substitute a toothed ring for the three pinions of the steering wheel assembly, and I do not claim that my invention is sufficiently broad to contemplate such arrangements, but the simple, inexpensive, easily applied and efficient attachments which I have described, constitute the gist of my invention, particular emphasis being laid upon the novel construction of the casting which supports the pinion 23 and rack 15.

Since probably the best results are obtained from the details shown and described, they may well be followed, but within the scope of the invention as claimed numerous minor changes might well be made.

I claim as my invention:

1. In a steering gear, a one-piece casting consisting of a bracket for attachment to the vehicle frame, said bracket having a depending arm enlarged at its lower end, a horizontally elongated body member joined at one end to said enlarged end of said arm and adapted for transverse disposition on the vehicle, said body member being provided on its upper side with a central lug inclining upwardly and forwardly from said body member and joined to one edge of said arm said lug and enlarged arm being formed integrally, said lug having front and rear flat sides, an upwardly and rearwardly inclined socket which opens through its front side, and an opening from its rear side into the inner end of the socket, the lower side of said body member having a longitudinal channel whose bottom is disposed in a plane parallel with the axis of said socket, and whose sides are disposed at right angles to said bottom, the front side wall of said channel being of less height than the rear wall thereof; a rack bar slidable in said channel, a bottom plate positioned over the open side of said channel to retain said rack bar in place, the front edge of said plate being spaced from the narrow front wall of the channel, bolts securing said plate in position and providing stops to limit the movement of said rack bar, a neck extending from said rack bar through the space between said bottom plate and said narrow channel wall and adapted for connection with a steering rod; a pinion in said socket adapted for mounting on an inclined steering shaft, and a plate secured over the open end of said socket.

2. In a vehicle steering gear, the combination with a steering post having on its end a fixed circular case, a steering shaft in said post having a head located in said case and provided with upstanding studs, a pinion concentric with said head, and a steering wheel for driving said pinion; of metal blocks having openings receiving said studs, the inner end of each block being pointed to engage said pinion and the outer end thereof being curved for contact with the peripheral wall of said case.

In testimony whereof I have hereunto set my hand.

MARION P. FUNK.

Witnesses:
GEO. D. WILSON.
H. Z. WEDGWOOD.